United States Patent [19]

Pellerito et al.

[11] Patent Number: 5,668,727
[45] Date of Patent: Sep. 16, 1997

[54] POWERTRAIN TORQUE CONTROL METHOD

[75] Inventors: Brian James Pellerito, Milford; Lucius B. Allen, Commerce Township, both of Mich.

[73] Assignee: General Motors Corporations, Detroit, Mich.

[21] Appl. No.: 430,649

[22] Filed: Apr. 28, 1995

[51] Int. Cl.$^6$ .............................. B60K 41/02; F02P 5/145
[52] U.S. Cl. ........................... 701/105; 477/101; 477/105; 123/339.11; 123/339.16; 701/54; 701/87
[58] Field of Search .................... 364/431.03, 431.05, 364/431.06, 424.1, 431.053, 431.052, 424.08, 424.083, 424.093, 424.095, 426.029, 426.033; 123/319, 339.11, 339.16, 406, 419, 428; 477/34, 101, 102, 105, 112, 113

[56] References Cited

U.S. PATENT DOCUMENTS

| | | | |
|---|---|---|---|
| 4,395,984 | 8/1983 | Yamaguchi et al. | 123/325 |
| 4,569,320 | 2/1986 | Collonia | 415/118 |
| 4,608,956 | 9/1986 | Katoh et al. | 123/417 |
| 4,658,789 | 4/1987 | Morita | 123/422 |
| 4,883,035 | 11/1989 | Shimomura et al. | 123/361 |
| 4,924,832 | 5/1990 | Abe | 123/419 |
| 5,025,380 | 6/1991 | Wataya et al. | 364/431.05 |
| 5,036,728 | 8/1991 | Kawasoe et al. | 74/858 |
| 5,109,818 | 5/1992 | Yoshida | 123/319 |
| 5,188,005 | 2/1993 | Sankpal et al. | 364/424.1 |
| 5,239,963 | 8/1993 | Ikebe et al. | 123/419 |
| 5,289,739 | 3/1994 | Muscaro et al. | 364/424.1 |
| 5,373,821 | 12/1994 | Nishi et al. | 123/339 |
| 5,445,124 | 8/1995 | Tomisawa et al. | 123/339.11 |

Primary Examiner—Kevin J. Teska
Assistant Examiner—Tan Q. Nguyen
Attorney, Agent, or Firm—Michael J. Bridges

[57] ABSTRACT

In a powertrain including an internal combustion engine coupled to a transmission, engine ignition timing is controlled to minimize the impact of severe mechanical load disturbances, such as resulting from transmission shifts into or out of park or neutral positions, wherein the ignition timing is gradually varied to match the characteristic of the load disturbance being compensated, and variation in ignition timing is delayed in accord with transmission responsiveness, such as indicated by transmission temperature, until the disturbance is actually impacting powertrain mechanical load. Control stability is improved by temporarily suspending potentially duplicate control operations until the mechanical load disturbance has been compensated.

3 Claims, 5 Drawing Sheets

POWERTRAIN TORQUE CONTROL METHOD

FIELD OF THE INVENTION

This invention relates to powertrain torque management and, more particularly, to powertrain mechanical load disturbance compensation.

BACKGROUND OF THE INVENTION

It is generally known in powertrain controls to adjust ignition timing and engine inlet air rate to improve powertrain control stability. Compensation is provided for mechanical load disturbances by sensing or predicting the disturbance and by commanding compensating engine output torque variations. Powertrain mechanical load disturbances include transmission gear changes and application and removal of accessory loads. The powertrain is very sensitive to such disturbances during engine idle operating conditions at which the disturbances may cause a perceptible engine speed or torque perturbation. Engine temperature, speed, and load may be used to quantify the appropriate level of torque compensation for a sensed or predicted disturbance. The compensation may take the form of a variation in ignition timing to modulate engine output torque. A timing offset may be referenced or calculated and the ignition timing of individual engine cylinders adjusted in accord therewith to mitigate the disturbance.

The application of the offset provides a step change in ignition timing resulting in a sudden change in engine output torque. Such a sudden change may not be properly timed to adequately compensate certain disturbances, such as disturbances that are not characterized by a sudden or immediate engine output torque change.

Furthermore, conventional compensation for powertrain load disturbances associated with a transmission gear change do not adequately account for transmission dynamics and the effect of transmission temperature on such dynamics. Transmission responsiveness varies significantly with temperature, yet conventional timing offsets are commonly calibrated at a given transmission temperature and then applied over the broad range of transmission operating temperatures. Only when the transmission is at the calibration temperature will such conventional compensation properly compensate the disturbance.

The conventional compensation may generate or reference the timing offset as a function of engine speed during an operating mode in which engine speed is not stable. For example, engine speed may be varying under the influence of an independent control process when the speed dependent timing offset is generated. A duplication in control compensation may result which can reduce control effectiveness and stability.

Accordingly, what is needed is a powertrain control which compensates for engine speed in a stable manner, closely modelling the timing and magnitude of the disturbance.

SUMMARY OF THE INVENTION

The present invention provides for powertrain torque compensation to overcome the effects of sensed powertrain disturbances by varying the timing and the magnitude of spark timing-based compensation to match the sensed disturbance for more complete disturbance compensation, and by temporarily suspending any independent control processes until the disturbance compensation is complete.

More specifically, transmission temperature information is provided as an indication of powertrain responsiveness. A delay factor is determined in accord with the temperature information so that ignition timing compensation is not applied until the powertrain is actually perturbed by the disturbance, which may be a significant delay period after a disturbance is first sensed. Following the delay period, a predetermined modulation schedule is referenced and the ignition timing varied in accord with the schedule, to provide a gradual variation in engine torque, more closely modelling the characteristic of the disturbance being compensated. The schedule begins with a small ignition timing offset and gradually increases the offset toward a target offset at a rate of increase corresponding to the perturbing torque associated with the disturbance. To improve transient control performance, engine speed is stabilized by minimizing variation in engine inlet air rate for the duration of any speed-dependent disturbance compensation, such as by temporarily preventing change in the restrictiveness of an idle air control valve. The time during which such change is prevented is determined as a function of the transmission temperature so as to correspond to the duration of the disturbance compensation.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
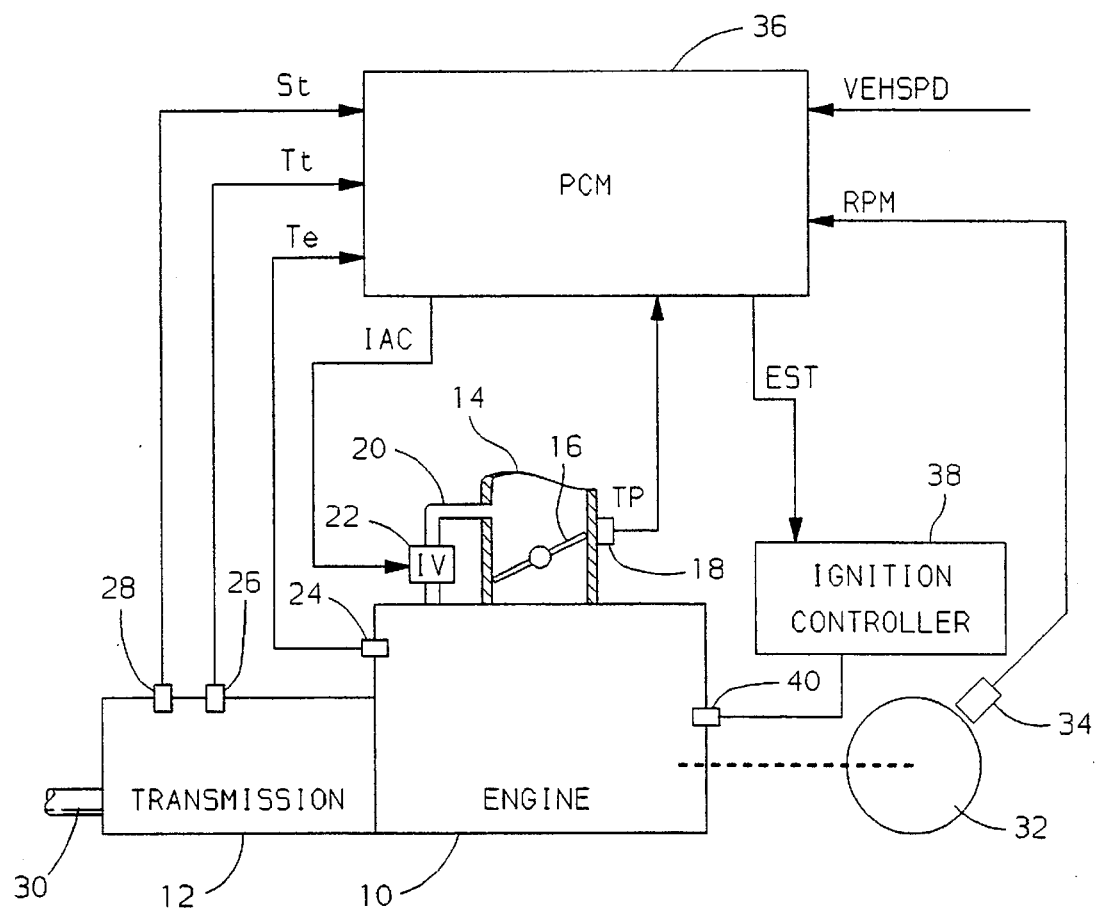
FIG. 1 is a general diagram of the powertrain control hardware for carrying out the preferred embodiment of this invention.

Referring to FIG. 1, inlet air governing to internal combustion engine 10 is provided through positioning of an inlet air valve 16. The valve position is sensed by conventional potentiometric position sensor 18 which communicates an output signal TP indicating the degree of displacement of the valve 16 away from an initialization position. The inlet air is received and combusted in the individual combustion chambers of the engine 10 to provide for engine operation. An engine output shaft 32, such as a conventional crankshaft, rotates during engine operation, the rate of rotation being sensed by a conventional Hall effect, variable reluctance or optical sensor 34 and communicated as periodic signal RPM indicative of engine speed. A conventional transmission 12 is coupled to the engine 10, the transmission having output shaft 30 mechanically linked to the driven wheels of an automotive vehicle (not shown), for driving such wheels. The rate of rotation of the transmission output shaft 30 relative to engine speed as indicated by the rate of rotation of engine output shaft 32 is determined by a manually or automatically selected active transmission gear, or the selected state or position of the transmission 12. The transmission has a plurality of states (or gears or positions) including a park position and a neutral position, both of which are non-motive, meaning that they correspond to operating conditions in which the powertrain does not contribute to automotive vehicle motion. The plurality of states further includes drive a state or several drive states which are motive, as they correspond to operating conditions in which the powertrain does contribute to motion of the automotive vehicle. A transmission gear (or state or position) sensor 28 indicating the current commanded active transmission gear (also expressed as the active transmission state or position) outputs signal St indicating such commanded active gear. In this embodiment, the signal St indicates a change in commanded transmission gear, state, position, etc. Following a change in the commanded state, a lag period must elapse prior to an actual change in transmission state, due to certain mechanical and hydraulic lag to which practical transmissions are subject. Such lag may be varying, such as with variations in transmission sump temperature. Such varying lag is addressed through a critical feature of this invention, to be described. The temperature of circulated engine coolant is transduced via conventional thermistor 24, outputting a signal Te indicating engine coolant temperature. The temperature of circulated transmission coolant related to transmission sump temperature is transduced by conventional thermistor 26 which outputs signal Tt indicating transmission coolant temperature. A vehicle speed signal VEHSPD is provided by either a conventional wheel speed sensor (not shown) for sensing the rate of rotation of at least one vehicle wheel (not shown), or a conventional sensor for sensing a rate of rotation of transmission output shaft 30, such as a sensor of the type described for sensor 34 of FIG. 1.

Sensor and transducer output signals are received and processed by various conventional hardware components of powertrain control module PCM 36, which is generally comprised of a single chip microcontroller including such components as read only memory units, random access memory units, arithmetic logic circuits, input buffer circuits and output buffer circuits.

The PCM 36 executes a series of control operations which, in this embodiment, take the form of a series of controller instructions executed in a step by step fashion while the PCM 36 is operating. Such operations include powertrain control, diagnostic and maintenance operations of a type generally understood by those possessing ordinary skill in the art of powertrain controls or diagnostics. In this embodiment, such operations include the ignition timing control operations executed in a step by step manner according to the flow of operations of FIGS. 2 through 4.

Figure 2:
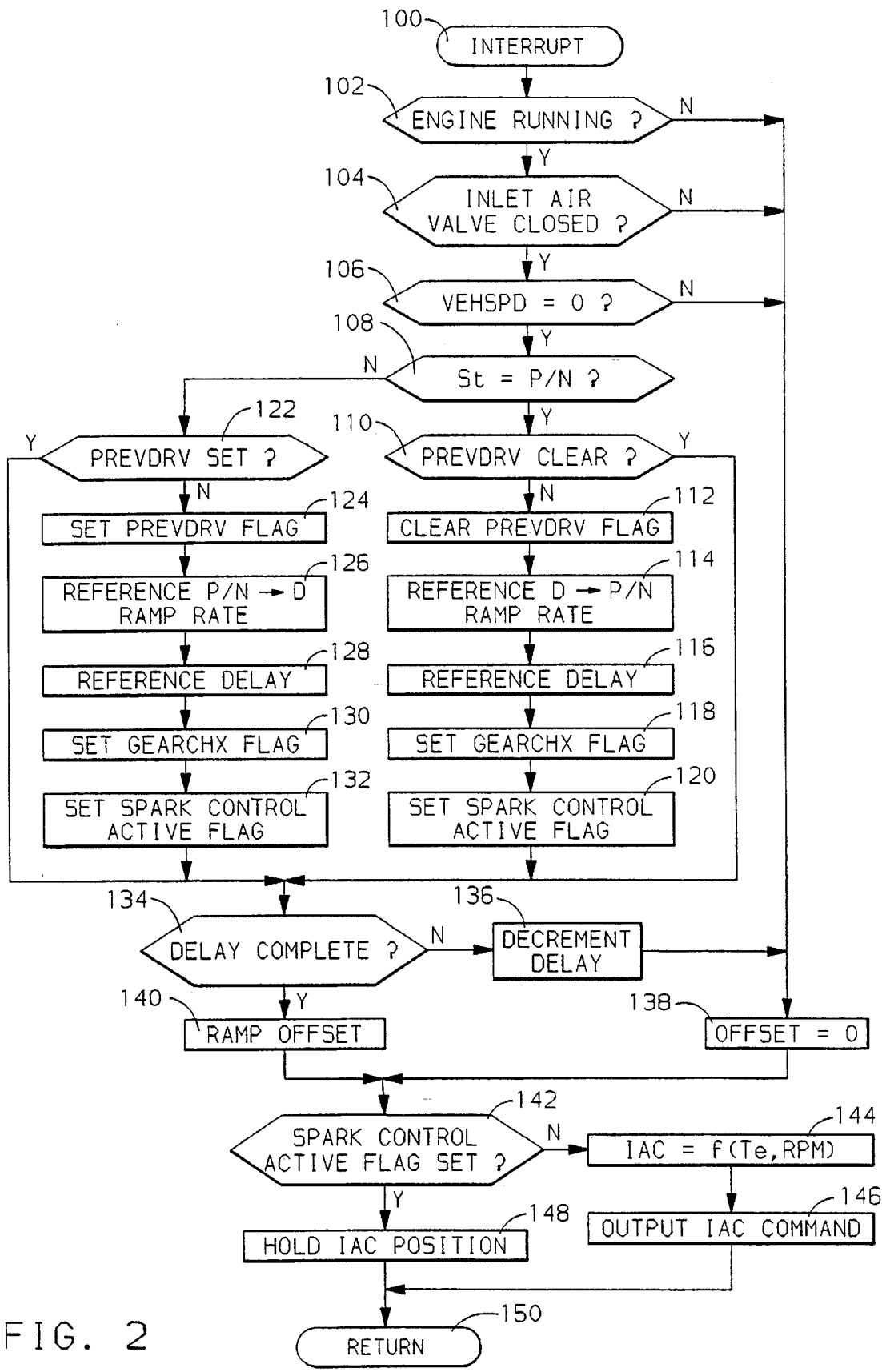
FIGS. 2 through 4 are computer flow diagrams illustrating the steps used to carry out the invention in accord with the embodiment of FIG. 1.

These routines provide for, among other functions, an adjustment of engine ignition timing to affect minor adjustment in engine output torque in accord with an improved engine control operation, for example, increasing engine speed and torque stability under certain traditionally troublesome operating conditions, such as operating conditions corresponding to transmission shift conditions during or near engine idle. Specifically, the operations illustrated as the routine of FIG. 2 are executed periodically, such as about every 12.5 milliseconds while the PCM 36 is operating. To provide for such periodic operation, a standard engine control interrupt may be established during PCM initialization operations following a start-up of the PCM 36 at the beginning of a vehicle operating cycle. The interrupt may be set up to occur about every 12.5 milliseconds and, upon occurrence, PCM operations of a lower priority are interrupted and control vectored to the interrupt service routine corresponding to the operations of FIG. 2, starting at a step 100.

Upon entry at the step 100, the routine of FIG. 2 proceeds to determine if an engine operating condition is present that may benefit from the ignition timing control provided through the present embodiment of this invention. In this embodiment, such engine operating condition is an engine idle condition, which is generally understood in the art to be subject to perceptible engine speed stability shortcomings, and which benefits significantly from the ignition timing control in accord with this invention. Specifically, the engine speed signal RPM is first analyzed at a step 102 to determine if indeed the engine is running. If signal RPM indicates a sustained rotation of the engine output shaft 32 (FIG. 1), the engine may be assumed to be running. If the engine is determined to be running at the step 102, the signal TP is analyzed at a next step 104 to determine if the engine inlet air valve is substantially closed. If so, vehicle speed is analyzed at a next step 106. If vehicle speed is substantially zero, than three conditions are met indicating a likelihood of an engine idle condition, and the control operations of this embodiment are carried out starting at a step 108. Alternatively, if any of the three conditions represented at the steps 102–106 are not met, the present engine operating condition is assumed to not be suited to the control of the present routine, and the control operations are bypassed by proceeding to a step 138, at which an ignition timing offset OFFSET is cleared to avoid perturbing ignition timing. OFFSET is added to a determined ignition timing value to offset ignition timing in accord with the principles of this invention, as will be further detailed.

Returning to the step 108, to provide for ignition timing adjustment in accord with this embodiment, PCM input signal St is analyzed to determine the present transmission state (the present active gear). If the present state is PARK or NEUTRAL (illustrated as P/N in this embodiment), then the transmission state during the last iteration of the routine of FIG. 2, which is stored as flag PREVDRV, is examined at a next step 110, to determine if a change in state into P/N has occurred over the most recent interrupt interval, such as the 12.5 millisecond interval of this embodiment. Such a change in transmission state may correspond to a period of engine speed and torque instability which, in accord with this invention, is compensated through controlled ignition timing adjustment. To provide initialization for such compensation upon detecting the change into P/N, the next steps 112–120 are executed. Otherwise, if no change into P/N is detected, a step 134, to be described, is executed to continue any previously initialized ignition timing compensation.

Specifically, when a change in transmission state into P/N is detected, indicated by flag PREVDRV being set at step 110, a first step 112 clears PREVDRV to indicate the current P/N transmission state for use in the next iteration of the routine of FIG. 2. A next step 114 then references, for example from PCM 36 read only memory, a ramp rate for the transition into P/N. The ramp rate may be calibrated through a conventional calibration process as the time rate of change in ignition timing from an initial timing angle to a target timing angle needed to compensate for the engine mechanical load disturbance associated with a change in transmission state from a drive state into the P/N state. The characteristic engine mechanical load disturbance associated with the change in transmission state may be measured or estimated during a conventional calibration process for the powertrain to which the control is applied. For example, the time rate of change in engine mechanical load from an initial load in a drive state to a final load in the PARK or NEUTRAL state may be measured or estimated. Then a time rate of change in compensating torque may be generated to offset the load disturbance. A ramp rate is then determined as the change in ignition timing for each periodic control loop needed to provide the time rate of change in compensating torque. In the 12.5 millisecond control loop of FIG. 2 which, in this embodiment, is the control loop responsible for adjusting the ignition timing offset, the ramp rate would be applied to change the ignition timing every 12.5 milliseconds. The ramp rate must be determined as the amount of change applied every 12.5 milliseconds to effect the proper time rate of change in compensating torque. The ramp rate referenced at the step 114 in this embodiment is about 2.5 degrees of spark retard.

Figure 6:
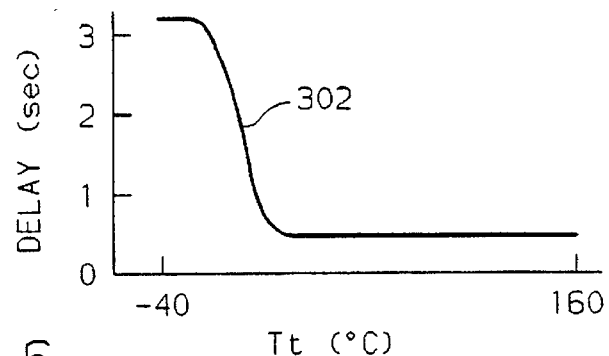

Returning to FIG. 2, after referencing the drive to P/N ramp rate, a delay value is referenced at a next step 116 as a time delay corresponding to the delay in change in mechanical load associated with a shift from a drive gear to a park or neutral gear. This delay is a function of transmission sump temperature as indicated by transmission coolant temperature. For example, transmission responsiveness may decrease with decreasing sump temperature, increasing the delay before a mechanical load change occurs following a transmission shift command. The mechanical load change may be described as resulting in an engine speed change or in a powertrain output torque change. Conversely, as the transmission sump increases in temperature, the engine may experience a load change more rapidly following a shift command. Curve 302 of FIG. 6 generally illustrates a calibrated relationship between transmission coolant temperature and the calibrated delay time referenced at the step 116. A maximum delay is associated with a low Tt, such as about −40 degrees Celsius. As Tt increases, the delay is reduced up to a warm-up temperature above which further temperature increase will not significantly affect transmission responsiveness. The curve 302 may be stored in the form of a representative function or a series of paired lookup values in a conventional lookup table. A referenced Tt value may be applied to the function or to the table and a corresponding delay value referenced thereby at the step 116. Following a detected transmission shift command from a drive gear into P/N, the referenced delay will be required to elapse before torque compensation will be initiated, so that such compensation is applied precisely at the time the load change corresponding to an actual transmission shift is occurring. By sensing transmission coolant temperature and applying the sensed temperature to model transmission sump temperature, and then by establishing a delay time as a function of the sump temperature, compensation for the significant variation in transmission responsiveness with variation in transmission sump temperature may be provided, yielding a significant improvement in load disturbance compensation.

Returning to FIG. 2, after referencing the delay value, a GEARCHX flag is set at a next step 118, indicating the detected change in transmission state, and a spark control active flag is next set at a step 120, indicating the ignition timing-based compensation of the present embodiment is now active. In accord with this invention, while such compensation is active, variations in the engine operating point as driven by controlled changes in engine parameters such as air and fuel may be minimized to improve control stability. The responsive ignition timing control included with the present invention is suited to transient compensation of load disturbances, obviating the need for additional control compensation during such transients. After setting the spark control active flag at the step 120, a next step 134 is executed, as will be described.

Returning to the step 108, if the transmission state St is not in P/N, a step 122 is executed to determine if the flag PREVDRV is set, indicating that a drive state was active for the most recent prior iteration of this routine. If PREVDRV is set, than no change in state of the transmission is detected, and the routine moves to the step 134, to be described. Otherwise, a change in transmission state has occurred from P/N to drive as detected at the step 122, and ignition timing compensation initialization operations illustrated in the steps 124–132 must be executed. Specifically, the PREVDRV flag is set at a first step 124, for use in the next iteration of the routine, and a P/N to drive state ramp rate is referenced at a next step 126. This ramp rate corresponds to a time rate of change in mechanical engine load associated with the change in transmission state from a PARK or NEUTRAL state to a drive state, and may be determined through a conventional calibration process in which the magnitude of the load change and the time rate of magnitude change may be measured or estimated. As described for the step 114, once the nature of the load change is measured or estimated, the rate of change in ignition timing to compensate the load change may be determined and translated to an amount of change in ignition timing to be applied for each control iteration, such as at the 12.5 millisecond iteration rate of the present embodiment. For example, in this embodiment, the P/N to drive ramp rate is about 0.5 degrees of spark timing advance for each 12.5 millisecond control loop iteration.

Figure 5:
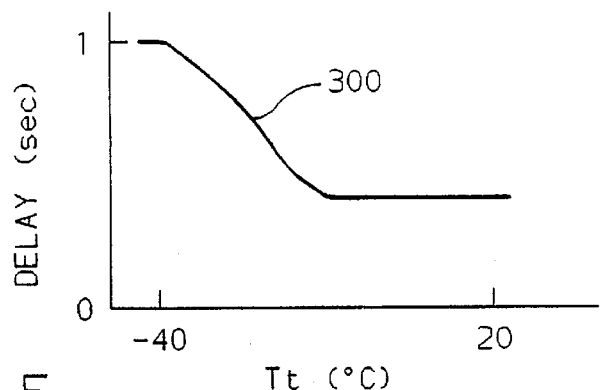
FIGS. 5-8 are graphs illustrating lookup parameters and ignition timing control values referenced during execution of the operations illustrated in the FIGS. 2-4.

After referencing the ramp rate at the step 126, a delay value is referenced at a next step 128 from PCM non-volatile memory, such as conventional read only memory. The delay value may be determined through a conventional calibration process as the amount of time delay following a change in commanded transmission state from P/N to drive before the mechanical load disturbance begins to impact the powertrain. Rather than immediately apply a compensating ignition timing adjustment following a detected request for a change in transmission state, the compensation in accord with this invention delays an appropriate amount of time to properly match the torque compensation with the actual timing of the resulting load disturbance. As described, the magnitude of this delay is dependent on transmission sump temperature, which may be modelled as a function of sensed transmission coolant temperature. Accordingly, to significantly improve the compensation timing precision for significant change in engine load resulting from a shift into or out of P/N, the present invention measures transmission coolant temperature, applies the measurement to a model to derive transmission sump temperature and applies the sump temperature to a calibration of the relationship between such temperature and the delay value. Curve 300 of FIG. 5 illustrates a typical calibration of such relationship for the powertrain of the present embodiment (FIG. 1). The curve demonstrates the more significant delay associated with a relatively cold transmission sump (such as about −40 degrees Celsius) and the significant change in responsiveness as the temperature Tt increases up to a temperature of about 25 degrees Celsius, above which no significant change in responsiveness related to temperature is calibrated.

Figure 3:
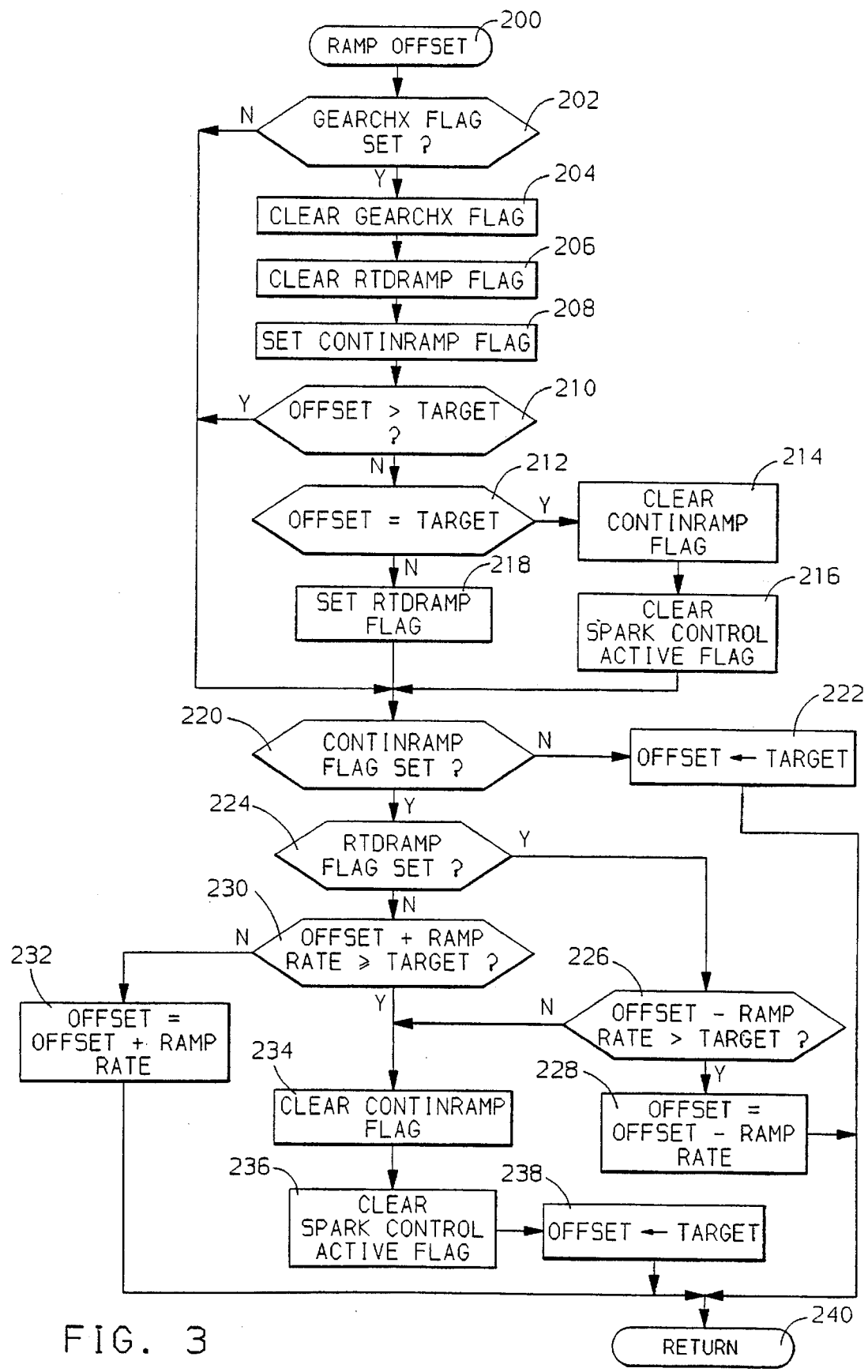

After referencing the delay value for the P/N to drive shift as a function of Tt at the step 128, the flag GEARCHX is set indicating the change in transmission state at a next step 130, and the spark control active flag is next set at a step 132. The delay value referenced at the step 116 or the step 128 is applied at the next step 134. Generally, the application of the spark timing offset used to gradually vary the ignition timing compensation from an initial timing value to a target timing value to compensate the mechanical load disturbance associated with a shift into or out of PARK or NEUTRAL (P/N), especially at engine idle, is delayed from the time a shift command is detected until the actual corresponding load disturbance is incident on the powertrain by the operations of steps 134 and 136. First, the delay is analyzed at the step 134 to determine if it has been reduced to zero. If so, the delay period is complete, and a ramp offset routine is executed by proceeding to a step 140, at which a series of operations are initiated, as illustrated in the routine of FIG. 3, to be described. Such routine adjusts the spark timing offset from an initial value to a target value at a time rate of change corresponding to the ramp rate as referenced at the applicable one of the described steps 114 or 126.

After executing the ramp offset routine, steps 142–148 are executed to provide for control of the idle air control actuator IV 22 of FIG. 1. Specifically, a spark control active flag is analyzed at a step 142. If the flag is set, the present idle air control actuator position is held constant by proceeding to a step 148 which bypasses steps providing for movement of the IAC actuator 22 (FIG. 1). As described, the spark control active flag indicates that torque control is currently compensating a powertrain mechanical load disturbance associated with a shift into or out of P/N. By avoiding change in the IAC command and thus movement of the IV 22 of FIG. 1 to vary engine inlet air rate until such compensation is complete, torque control stability and robustness is improved. Returning to the step 142, if the spark control active flag is not set, an IAC command is determined at a next step 144 as a function of engine parameters, such as engine coolant temperature Te and engine speed RPM. As is generally understood in the art, the IAC command provides for a controlled metering of intake air to the engine at a limited rate at or near engine idle providing for precise engine idle speed control. After determining the IAC command through any conventional control function at the step 144, the IAC command is output at a next step 146 to the idle air control actuator 22 of FIG. 1. After the step 146 or 148, a next step 150 is executed to return to any operations that were ongoing prior to the interrupt that initiated execution of the routine of FIG. 2. Returning to the step 134, if the delay is not elapsed, a step 136 is executed to decrement or decrease the delay value by a predetermined amount toward zero. After decreasing the delay, or in the event any of the conditions indicating an engine idle operating condition were not found to be present at the described steps 102–106, a step 138 is executed at which the ignition timing offset is cleared, so that ignition timing compensation is not applied through the present embodiment until appropriate conditions are present. After clearing the offset, the described steps 142–150 are executed.

The operations of the routine of FIG. 3 are executed to provide for a ramping of the offset according to the time rate of change in the load disturbance being compensated thereby. While the present embodiment of this invention describes a fixed ramp rate, a variable ramp rate is also to be included within the scope of the invention, and may be carried out in a practical system, such as that of the preferred embodiment, simply by storing a more detailed model of the mechanical load disturbance variation over time as a calibrated function of engine inlet air rate or cylinder inlet air rate. Such variation may be determined through a detailed calibration process during which the engine load variation during a shift into or out of PARK or NEUTRAL P/N for a specific powertrain substantially at an engine idle condition may be measured or estimated. The variation may then be stored as a representative function or as a series of points referenced as a function of engine load.

When called at the step 140 of the routine of FIG. 2, the routine of FIG. 3 is initiated starting at a step 200 and proceeding to determine, at a step 202, if a gear change has occurred as indicated by flag GEARCHX being set. If the flag is set, steps 204–218 are executed to process any sign change in the ignition timing offset value. Otherwise, the steps 204–218 are bypassed so that the sign previously set for the offset may be used. In such case the routine moves from the step 202 to a next step 220, to be described.

Returning to the step 202, if the GEARCHX flag is set, the flag GEARCHX is cleared at a next step 204, a flag RTDRAMP indicating the direction of change in the offset is cleared at a next step 206, and a flag CONTINRAMP indicating a ramping of the offset is in progress is set at a next step 208. The routine next proceeds to a step 210 to compare the ignition offset value to a target value toward which the offset is gradually ramped in accord with an aspect of this invention.

Figure 7:
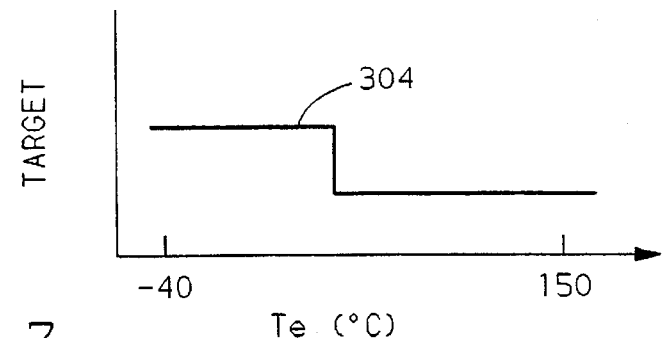
Figure 8:
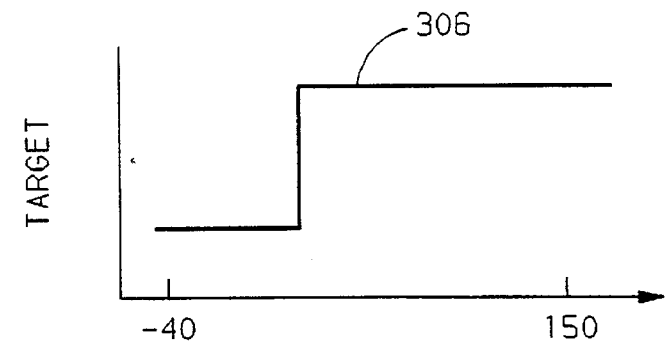

The target value is established through conventional ignition timing control as the retard value that, when combined with the base ignition timing command, yields a preferred ignition timing angle, such as the MBT angle, as is generally understood in the art. The target value is stored as a predetermined function of engine coolant temperature and of transmission state. Curve 304 of FIG. 7 illustrates a calibrated relationship between engine coolant temperature Te and the target value for the case in which the transmission 12 (FIG. 1) is in a P/N state. As illustrated by the curve 304, a relatively high target is required under cold engine operation, and when the engine warms up to about 40 degrees Celsius or greater, the calibrated target drops significantly. Likewise, curve 306 of FIG. 8 illustrates a calibrated relationship between engine coolant temperature Te and the target value for the case in which the transmission 12 (FIG. 1) is in a drive state. As illustrated by the curve 306, a relatively low target is required under cold engine operation, and when the engine warms up to about 40 degrees Celsius or greater, the calibrated target increases significantly.

Such relationship between Te, St and the target values may be stored as a predetermined representative function or as a conventional lookup table in non-volatile memory of the PCM 36, such as in non-volatile RAM or in conventional read only memory. In this embodiment, an engine camshaft event interrupt service routine carries out the updating of the target value once for each engine cycle, such as by referencing the applicable target value using the lookup parameters of St and Te following each complete revolution of an engine camshaft, which conventionally corresponds to each complete engine cycle.

Returning to FIG. 3, if the offset does not exceed the target at the step 210, a step 212 is executed to determine if the target and the offset are equal, indicating that further ramping of the offset toward the target is presently unnecessary. If the target equals the offset at the step 212, the CONTINRAMP flag is cleared at a next step 214 to indicate the end of the current ramping process, and the spark control active flag is cleared at a next step 216, so that temporarily interrupted engine control operations may be continued, as will be described. Next, the routine proceeds to a step 220, to be described.

If the offset and the target are not equal as determined at the step 212, the RTDRAMP flag is set at a next step 218, indicating the offset is less than the target and thus needs to be increased gradually in accord with an aspect of this invention toward the target at a rate of increase that corresponds to the nature of the load disturbance being compensated thereby, as described. If the offset was determined to be greater than the target at the step 210, the RTDRAMP flag will remain clear (as established at the described step 206) indicating the offset must be decreased toward the target at a controlled rate of decrease.

After setting the RTDRAMP flag at the step 218, or after the step 216, or if the offset was greater than the target at the step 210, the flag CONTINRAMP is analyzed at a next step 220 to determine if continued ramping of the offset is required, indicated by a set CONTINRAMP flag. If CONTINRAMP is clear, the ramping is currently not required, and a step 222 is executed to set the offset to the final or target value, after which a step 240 is executed to return to the step 140 of the routine of FIG. 2 from which the present routine was initiated.

Returning to the step 220, if the CONTINRAMP flag is set, further ramping of the offset is required and the routine moves to a step 224 to determine the required direction of ramping. If the RTDRAMP flag is set at the step 224, the ramping must affect an increase in the offset, and if RTDRAMP is clear, the ramping must affect a decrease in the offset. In the case in which an increase is required, a limit check is carried out at a next step 230, to determine if the present offset value plus the ramp rate will equal or exceed the target value, indicating the ramping process is currently complete. If the ramping is complete as determined at the step 230, the flag CONTINRAMP is cleared at a next step 234, the spark control active flag is then cleared at a next step 236, and the offset value is assigned the target value at a next step 238. Next, the described step 240 is carried out. Returning to the step 230, if the sum of the offset and the ramp rate is less than the target value, ramping is continued by proceeding to a next step 232 to increase the offset value by the ramp rate. The described step 240 is next executed.

Turning back to the step 224, if the RTDRAMP flag is set, a ramping down of the offset is required, and is provided for by first proceeding to a step 226 to determine if the present offset value less the ramp rate is less than or equal to the target, indicating the ramping is complete. If the ramping is determined to be complete at the step 226, the described steps 234–238 are next executed to clear the CONTINRAMP and spark control active flags, and to set the offset to the target value. The described step 240 is next executed. If the ramping is not determined to be complete at the step 226, the offset is decreased by the ramp rate at a next step 228, after which the described step 240 is executed to return to the routine of FIG. 2.

Figure 4:
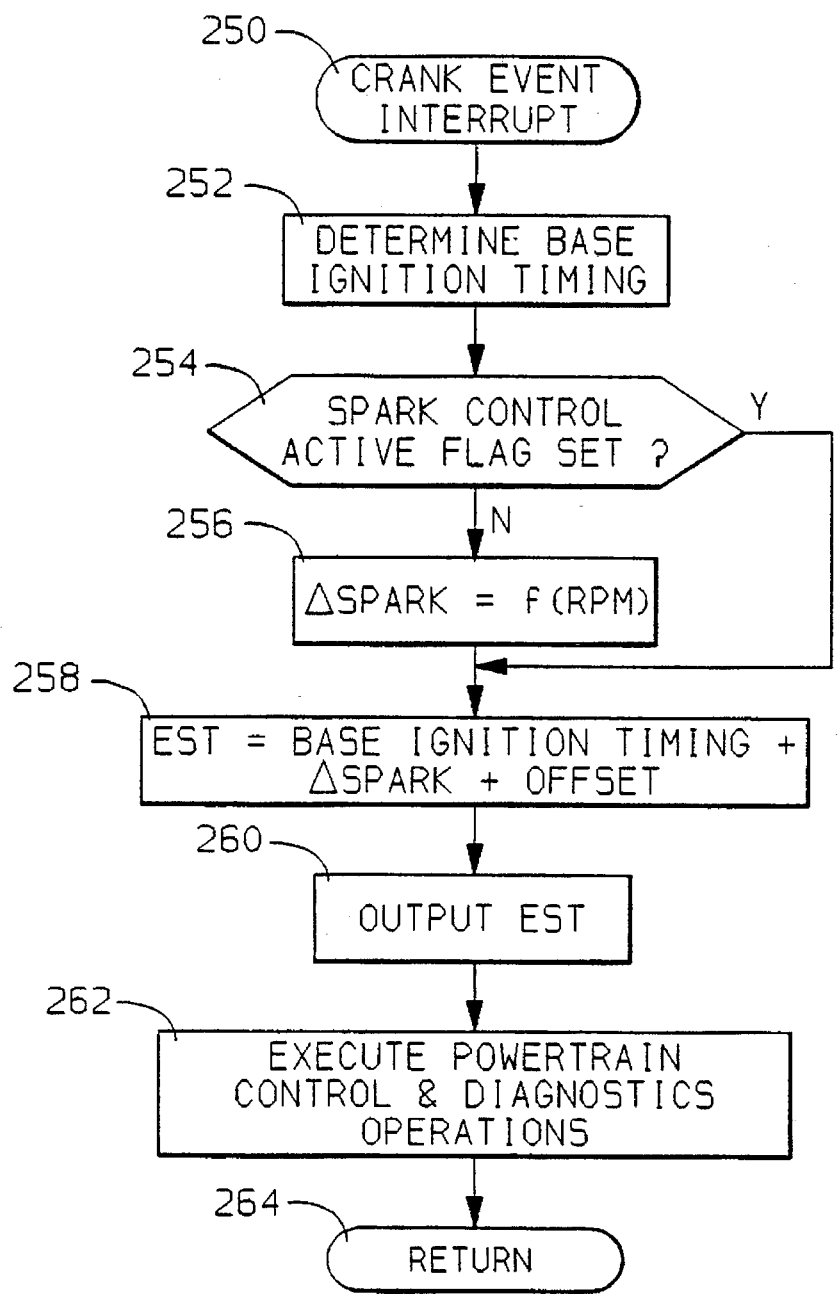

The application of the offset value in a determination of a final ignition timing value in accord with this embodiment is illustrated in the general routine of FIG. 4. The routine of FIG. 4 is executed once for each engine cylinder event, such as may, through generally understood engine control practices, be indicated through passage of a tooth or slot (not shown) on the engine crankshaft 32 (FIG. 1) by a predetermined fixed position. For example, an interrupt may be generated once for each engine cylinder power event as indicated by the tooth or slot passage, and an interrupt service routine executed upon occurrence of the interrupt. The interrupt service routine may include operations generally understood to be required to service each cylinder event in accord with conventional engine control practice. Such operations may include updating and issuing of engine control commands, such as fuel and spark commands, and diagnostic and maintenance operations well-known in the art. The routine of FIG. 4 is provided to illustrate those operations of the present embodiment that are carried out following each cylinder event. The many generally known operations relating to engine control, diagnostic, and maintenance functions that may be carried out once for each engine cylinder event or to properly service a cylinder event interrupt may not be explicitly illustrated in the operations of FIG. 4, but may be easily added through the exercise of ordinary skill in the art.

Turning to FIG. 4, upon occurrence of each engine cylinder event interrupt, any controller operations currently being carried out are temporarily suspended and the routine of FIG. 4 is initiated starting at a step 250 and proceeding to a next step 252 at which a base ignition timing value is determined through execution of any conventional ignition timing control function generally available in the art. For example, the base ignition timing value may be referenced from a conventional lookup table stored in non-volatile PCM memory, such as read only memory. The table entries may include a series of base ignition timing values referenced as a function of sensed or calculated present engine parameter values, such as present values of engine load and engine speed. The timing values of the table may be generated through a conventional calibration process as the preferred spark timing values for a given engine operating point as indicated by engine speed and engine load. In this embodiment, a separate lookup table is calibrated for engine idle, such that base ignition timing values may be referenced from such table during engine idle operating conditions, and may be referenced from other tables, such as at least one non-idle lookup table, when not at the idle operating condition.

After determining the base ignition timing value, the spark control active flag is analyzed at a step 254. If the spark control active flag is set, then the spark control operations of the present invention are currently active. As described, the control operations of this invention are established to precisely compensate the load disturbance associated with a shift into or out of PARK or NEUTRAL, especially at idle. While such operations are ongoing, the additional compensation provided by such control processes as engine inlet air control, fuel control or other spark timing control operations are assumed to be unnecessary to compensate the load disturbance and, indeed, may reduce transient powertrain control performance and stability. The spark control active flag, when set, is used to prevent additional unwanted compensation during the short period of time in which the ignition timing control of the present invention is operating.

Returning to FIG. 4, if the spark control active flag is not set, as determined at step 254, an ignition timing compensation term ASPARK is determined as a predetermined function of engine speed RPM at a next step 256. The term ASPARK is generally used in ignition timing control operations in the art to advance ignition timing as needed for the current engine operating conditions to arrive at a desirable engine output, such as the output corresponding to the MBT ignition timing. The relationship between ASPARK and RPM may be established through a conventional calibration process to arrive at a desirable degree of ignition timing advance over an expected range of engine speeds.

Next, or if the spark control active flag was set at the step 254, a step 258 is executed to generate a spark timing command as a sum of the base spark timing, the ASPARK value and the offset value generated through the described operations of the routines of FIGS. 2 and 3. The EST value represents the angular offset prior to top dead center position of an active cylinder (a cylinder to nest undergo its power event) that an ignition event is desired. The EST value is next output at a step 260 to a conventional ignition controller, such as controller 38 of FIG. 1, for issuance to the next active ignition driver at a timing dictated by the EST value.

Following the step 260, any conventional control or diagnostic functions commonly executed following engine cylinder events may be carried out in a manner generally understood in the art. Control or diagnostics of engine systems including fuel, air, ignition and exhaust gas treatment systems or other generally known systems may be provided at step 270. Following such additional control and diagnostics, the interrupt service routine is concluded at a next step 272, and any prior operations interrupted by the occurrence of the cylinder event interrupt may be resumed.

The preferred embodiment for the purpose of explaining this invention is not to be taken as limiting or restricting this invention since many modifications may be made through the exercise of ordinary skill in the art without departing from the scope of this invention.

The embodiments of the invention in which a property or privilege is claimed are described as follows:

1. In an automotive internal combustion engine including an idle air control valve which is positioned to govern inlet air to the engine when the engine is at idle, a torque control method in which automotive internal combustion engine spark timing is controlled to vary engine output torque to compensate for automotive powertrain mechanical load disturbances, comprising the steps of:

sensing a powertrain mechanical load disturbance;

determining a time rate of change in spark timing for compensating the sensed mechanical load disturbance;

varying spark timing in accord with the determined time rate of change;

sensing when the engine is at idle; and holding the idle air control valve at a substantially constant position while the spark timing is being varied in accord with the determined time rate of change.

2. In a powertrain comprising an internal combustion engine coupled to a transmission, the engine having an idle air control valve positioned to control engine inlet air rate, a method for varying engine ignition timing to control engine output torque during a transmission shift maneuver between a motive and a non-motive transmission state, comprising the steps of:

sensing occurrence Of the transmission shift maneuver;

referencing a predetermined ignition timing variation rate corresponding to the sensed shift maneuver;

referencing a predetermined target ignition timing;

adjusting ignition timing at the referenced variation rate toward the target ignition timing to control engine output torque during the transmission shift maneuver; and maintaining the position of the idle air control valve substantially constant while the adjusting step is adjusting ignition timing.

3. In a powertrain comprising an internal combustion engine coupled to a transmission wherein the engine includes an idle air control valve positioned to control engine inlet air rate, a method for varying engine ignition timing to control engine output torque during a transmission shift maneuver between a motive and a non-motive transmission state, comprising the steps of:

sensing occurrence of the transmission shift maneuver;

referencing a predetermined ignition timing variation rate corresponding to the sensed shift maneuver;

referencing a predetermined target ignition timing;

determining a delay period representing a delay in time between a sensed transmission shift and an actual powertrain mechanical load change;

following the delay period, adjusting ignition timing at the referenced variation rate toward the target ignition timing to control engine output torque during the transmission shift maneuver; and maintaining the position of the idle air control valve substantially constant for the duration of the delay period and while the adjusting step is adjusting ignition timing.

* * * * *